US009002027B2

(12) United States Patent
Turnbull et al.

(10) Patent No.: US 9,002,027 B2

(45) Date of Patent: Apr. 7, 2015

(54) SPACE-TIME NOISE REDUCTION SYSTEM FOR USE IN A VEHICLE AND METHOD OF FORMING SAME

(75) Inventors: Robert R. Turnbull, Holland, MI (US); Michael A. Bryson, Hudsonville, MI (US)

(73) Assignee: Gentex Corporation, Zeeland, MI (US)

(*) Notice: Subject to any disclaimer, the term of this patent is extended or adjusted under 35 U.S.C. 154(b) by 604 days.

(21) Appl. No.: 13/169,614

(22) Filed: Jun. 27, 2011

(65) Prior Publication Data

US 2012/0330652 A1 Dec. 27, 2012

(51) Int. Cl.

| | |
|---|---|
| ***H04R 3/00*** | (2006.01) |
| ***A61F 11/06*** | (2006.01) |
| ***G10K 11/16*** | (2006.01) |
| ***H03B 29/00*** | (2006.01) |
| ***H04B 1/00*** | (2006.01) |
| ***G10L 21/02*** | (2013.01) |
| *H04M 1/60* | (2006.01) |
| *G10L 21/0216* | (2013.01) |

(52) U.S. Cl.

CPC .............. *G10L 21/02* (2013.01); *H04M 1/6075* (2013.01); *G10L 2021/02166* (2013.01)

(58) Field of Classification Search

CPC .. H04R 3/005; H04R 1/406; H04R 2201/401; H04M 1/6066; G10L 21/02; G10L 2021/02166

USPC .................. 381/92, 71.11, 71.12, 122, 66, 86

See application file for complete search history.

(56) References Cited

U.S. PATENT DOCUMENTS

| | | | | |
|---|---|---|---|---|
| 4,536,887 | A * | 8/1985 | Kaneda et al. | 381/92 |
| 8,009,840 | B2 * | 8/2011 | Kellermann et al. | 381/92 |
| 2010/0177908 | A1 * | 7/2010 | Seltzer et al. | 381/92 |

OTHER PUBLICATIONS

Bernard Widrow et al., "Adaptive Signal Processing," 1985, pp. 15-29 and 231-236.

J. R. Guerci, "Space-Time Adaptive Processing for Radar," 2003, pp. 1-7, Artech House, Boston, London.

Michael L. Seltzer and Ivan Tashev, A LOG-MMSE Adaptive Beamformer Using a Nonlinear Spatial Filter, Speech Technology Group, Microsoft Research, Redmond, WA 98052, {mseltzer, ivantash} @microsoft.com, Sep. 2008, 4 pages.

* cited by examiner

*Primary Examiner* — Vivian Chin

*Assistant Examiner* — Douglas Suthers

(74) *Attorney, Agent, or Firm* — Price Heneveld LLP; Scott P. Ryan

(57) ABSTRACT

A space-time adaptive beamformer for reducing noise in a vehicle that includes two or more microphones. A first weighting network is used for adjusting the signal characteristics of at least one output of the microphones while at least one delay network is also used for delaying the output in time of at least one output of the microphones. A second weighting network then adjusts the signal characteristics of the output of each of the delay networks and at sum adder works to combine the output of the first weighting network and the second weighting network. Finally, an output of the sum adder is combined with an artificial noise free reference signal to provide a low distortion noise reduced output. By generating a desired signal that acts as an artificial noise free signal reference, adequate noise reduction to be obtained without the distortion created due to processing non-linearity.

11 Claims, 4 Drawing Sheets

SPACE-TIME NOISE REDUCTION SYSTEM FOR USE IN A VEHICLE AND METHOD OF FORMING SAME

FIELD OF THE INVENTION

The present invention relates generally to noise reduction and more specifically to a noise reduction system applicable for use with electronic equipment in a vehicular environment.

BACKGROUND

Microphones used in automotive electronic applications, such as cell phones, navigational systems, and vehicular control, are well-known in the art. An automotive vehicle presents challenges to the use of a microphone in view of the numerous sources of noise that can interfere with vocalized speech inside the vehicle. These challenges can be particularly difficult when adapting a microphone solution for use in the vehicular rearview mirror assembly. In addition to the difficulties of rejecting noise within the vehicle, disturbances to the sound field caused by the rearview mirror, windshield and other surfaces must also be addressed.

The prior art includes systems that use microphones positioned in tandem, i.e., a first microphone positioned in front of a second microphone. This type of system works to produce a difference signal for canceling noise by subtracting the signals and using a delay to account for the distance between the microphones. However, the rearview mirror disturbs the sound field between the two microphones, which results in poor subtraction over much of the frequency range of interest. Additionally, this front and back microphone configuration requires the rearview mirror to include a deeper housing for supporting the rearward microphone, which is often an undesired design feature in view of styling, weight, vibration sensitivity, and molding required in the manufacturing process. It may be desirable to use silicon microphones based on MEMS technology due to their long term stability, small size and ease of use in a mass production environment.

Other prior art systems have used microphones that were positioned in parallel that use digital processing or simple delay networks to improve operation. The use of digital processing introduces delay and variation over time that disrupts systems designed for a single microphone. Therefore, this type of simple delay based processing does not yield the desired performance. Additionally, many of the microphone systems currently in use were developed under the assumption that the microphone would be used in connection with a handheld mobile phone. In handheld applications, the very close proximity of the user's mouth to the microphone assures a very high speech-to-noise content for most situations. These systems do not function correctly with microphones used at a distance because audio received at increased distances does not exhibit the same frequency characteristics.

Microphones distant from an audio source that are used in a hands-free automotive systems will often have a very significant noise content, and manifest a wider dynamic range. A "close use" situation or microphone may be defined as one positioned within 20 cm of the audio source such as a user's mouth. The dynamic range is increased because of the broader range of possible speech signal levels and relative noise content. In a distant use situation, if a wider dynamic range speech signal is processed via the phone system, especially phones employing code division multiple access (CDMA), much of the desired speech can be lost because the processing system (CODEC) is unable to correctly determine that speech is present. Thus, the phone system functions as if a voice plus noise signal is comprised of only noise.

Many noise reduction systems as used in the prior art seek to lower only the noise content while retaining the speech in its unaltered state. This process does not restore the nature of the speech signal to that of a close use microphone as found in a typical handset and as a result does not yield a signal able to pass through the cell phone's CODEC. Also, most single channel noise reduction algorithms reduce noise but do not necessarily improve speech intelligibility for humans or machines. The only algorithms consistently shown to improve intelligibility are based on directional processing and necessarily utilize two or more microphones. With typical processing, there will be many frequency bands or occurrences where the speech content, though significant, is not great enough to overcome the residual noise to the extent so as to avoid being interpreted as noise. Thus, in latter processing stages, these frequency bands or occurrences will be removed because they appear to be only unwanted noise. Even though the speech content is significant, it is not of a great enough magnitude to overcome the noise in certain frequency bands or at certain times.

Many different types of noise reduction systems are known in the art for reducing internal noise within a vehicle. Some of these systems operate to reduce internal vehicular noise using digital signal processing techniques. Digital signal processing (DSP) refers to the representation of discrete time signals by a sequence of numbers or symbols that are subsequently processed. The goal of DSP is usually to measure, filter and/or compress continuous real-world analog signals. DSP algorithms have long been run on standard computers, programmable gate arrays, on specialized processors called digital signal processors, or on purpose-built hardware such as ASICs.

One such DSP technique used to mitigate noise involves the use of least mean squares (LMS) algorithm. LMS algorithms are a class of adaptive filters used to mimic a desired filter by finding the filter coefficients that relate to producing the least mean squares of the error signal i.e. the difference between the desired and the actual signal. The LMS algorithm operates using a stochastic gradient descent method since the filter is only adapted based on the error at the current time. This type of DSP technique typically operates by obtaining a filter coefficient by approximating the gradient in order to simplify the calculation and then utilizing it in an adaptive filter correction formula such as: LMS, normalized least mean squares (NLMS), Affine Projection, proportionate normalized least means square (PNLMS) or other adaptive algorithm. Although LMS algorithms have been practically used in vehicle applications, these techniques often use a prerecorded reference signal which is not robust against changes in vehicle acoustics or driver position.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1A:
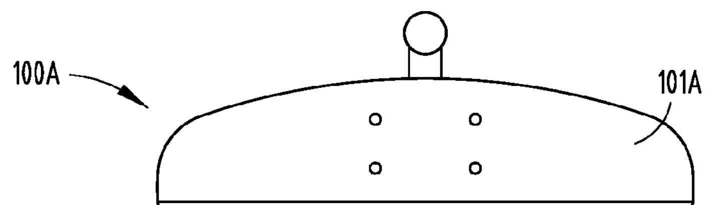
FIGS. 1A-1F are tops views of a rearview mirror assembly as used in a vehicle that include a plurality of microphone ports in accordance with various embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to a space-time noise reduction system. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of a space-time noise reduction system as described herein. The non-processor circuits may include, but are not limited to, a radio receiver, a radio transmitter, signal drivers, clock circuits, power source circuits, and user input devices. As such, these functions may be interpreted as steps of a method to perform space-time noise reduction. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

FIGS. 1A to 1F are top views of a rearview mirror assembly using a vehicular microphone system in accordance with an embodiment of the invention. The rearview microphone assembly 100A, 100B, 100C, 100D, 100E, 100F includes a housing 101A, 101B, 101C, 101D, 101E, 101F that is supported within the interior of the vehicle. A mirror 103A, 103B, 103C, 103D, 103E, 103F is used by the driver to view objects from the rear of the vehicle. Each microphone assembly 100A, 100B, 100C, 100D, 100E, 100F includes two or more transducers, such as microphones, that are positioned within the microphone assembly 100A, 100B, 100C, 100D, 100E, 100F and are used to capture voice from inside a vehicle. The microphones may be placed either at the top and/or bottom of the housing. Although FIGS. 1A to 1F illustrate microphone ports, those skilled in the art will recognize that a corresponding microphone device is generally located in close proximity to each port.

Figure 1B:
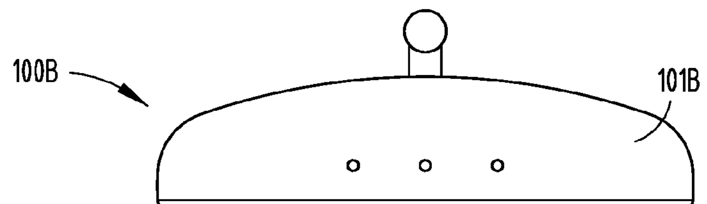
Figure 1C:
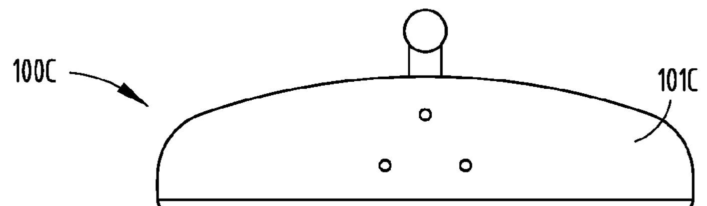
Figure 1D:
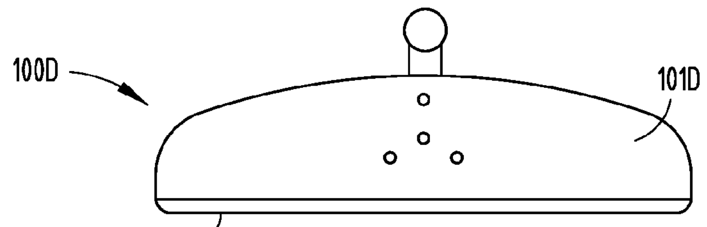
Figure 1E:
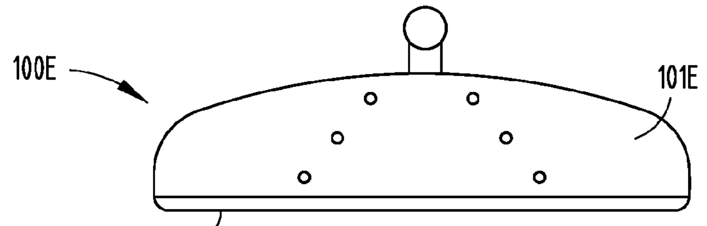
Figure 1F:
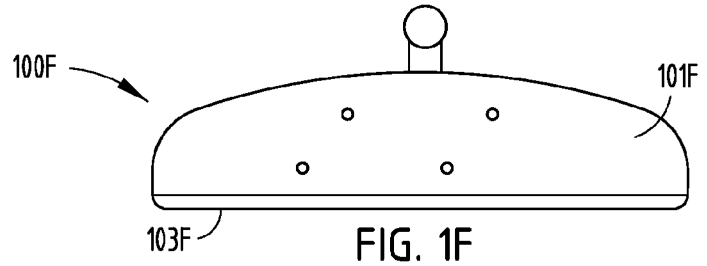

Although two microphones can be used, FIGS. 1A to 1F illustrate examples of various microphone arrays that are configured using a greater number of microphones. For example, FIG. 1A shows the use of four microphones used in a rectangular configuration to form a single array. FIG. 1B shows three microphones used in a tandem configuration to form a single array. FIG. 1C shows three microphones used in a triangular configuration to form a single array. FIG. 1D shows four microphones used in a star-like configuration to form a single array. FIG. 1E shows four microphones used in a trapezoidal configuration to form a single array. Finally, FIG. 1F shows six microphones used in a slanted tandem configuration to form both driver and passenger microphone arrays. Although the plurality of microphones illustrated in FIGS. 1A to 1F are used in connection with a rearview mirror housing assembly, it will also be recognized that the spirit of the invention is not so limited as the plurality of microphones might also be mounted in a vehicle headliner, overhead console, A-pillar or other convenient location. Additionally, the plurality of microphones may be located in different orientations in the rearview mirror assembly including but not limited to other tandem, parallel and/or triangular configurations.

Figure 2:
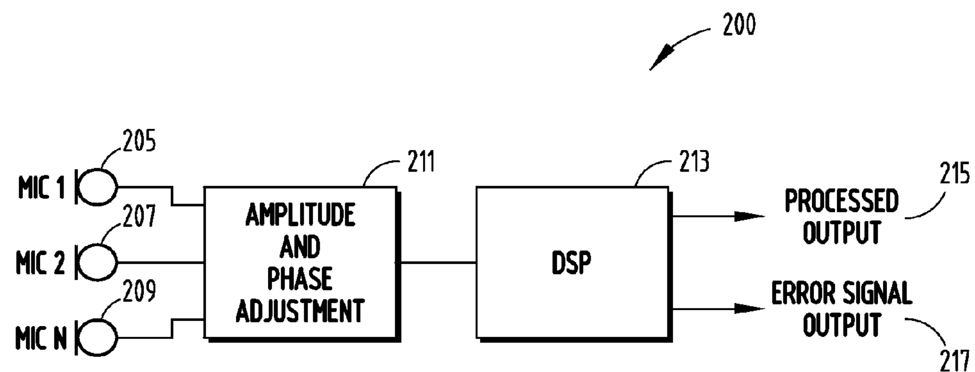
FIG. 2 is a block diagram showing the system configuration using the plurality of microphones as shown in FIGS. 1A-1F according to an embodiment of the present invention.

FIG. 2 is a block diagram showing the system 200 configuration using the plurality of microphones shown in FIGS. 1A-1F. The outputs from the plurality of microphones 205, 207 and 209 are directed to an amplitude and phase adjustment 211 block and then may be further processed by the DSP 213. The DSP 213 provides both a processed output 215 and an error signal output 217 for use in further refining the audio output signals. It should be understood that the phrase "rear view mirror" can be used interchangeably with "review display" if the rearview display system is camera based rather than reflective.

Figure 3:
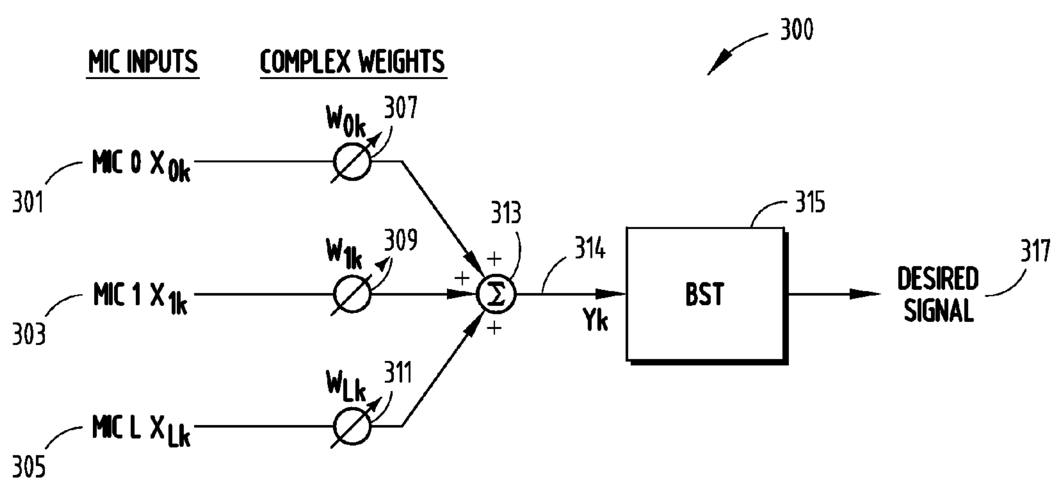
FIG. 3 is a block diagram illustrating a fixed beamformer microphone system for one frequency band according to an embodiment of the present invention.

FIG. 3 is a block diagram illustrating one band of a pilot 300 or "fixed" beamformer microphone array where beamforming is preformed on a plurality of frequency bins or bands e.g. 32 bands according to an embodiment of the present invention. The adaptive linear combiner includes a plurality of microphones such as microphones 301, 303 and 305 where the phase of the audio input signals can be adjusted using a plurality of complex weights 307, 309, 311 respectively. The complex weights 307, 309, 311 can be iteratively adjusted such that their respective outputs are supplied to a sum adder 313 that provides a signal output that is close to and/or within a predetermined range of a desired signal. The combiner is "linear" since when the weights are fixed, it becomes a linear system. The output 314 is supplied to a noise reduction algorithm referred to herein as the Bryson-Schwetz-Turnbull (BST) algorithm 315 for its inventors. Each band has its own set of complex weights 307, 309 and 311.

An embodiment of the present invention uses the BST algorithm to generate a substantially low noise reference signal 317 for microphone noise reduction using angular processing techniques. Those skilled in the art will recognize that the well known Aarabi's algorithm, can provide a fairly high level of noise reduction but also tends to introduce high levels of distortion and/or artifacts in the remaining processed speech. Also, the Aarabi algorithm requires the computation of the phase angle of each microphone used in the gain calculation. The angle calculation involves computing approximately two arctangents per fast Fourier transform (FFT) frame per band which is a microprocessor intensive process (MIP) requiring rapid and complex mathematical calculations. Moreover, the algorithm does not provide optimum gain since it is difficult to use in a complex acoustical environment such as a car or other automotive vehicle. This is due to the phase differences between acoustical waves that do not typically follow simple "free space" rules in noise reduction calculations. The algorithm developed by Parham Aarabi et al. is discussed in the publication entitled "Phase-Based Dual-Microphone Robust Speech Enhancement"; IEEE Transactions on Systems, Man, and Cybernetics—Part B Cybernetics, Vol. 34, No. 4; August 2004, pp 1763-1773 and is herein incorporated by reference in its entirety.

A similar algorithm developed by Ingo Schwetz, used to develop the BST algorithm, eliminates one of the angle calculations used in the Aarabi algorithm by calculating the angle of the cross product of a microphone pair. This technique is disclosed in U.S. application Ser. No. 12/847,189 entitled Vehicular Directional Microphone Assembly For Preventing Airflow Encounter, assigned to Gentex Corporation which is herein incorporated by reference in its entirety. In use, the Schwetz algorithm's gain function is very complex and contains two hypergeometric functions which are generally slow to compute using standard microprocessor techniques. Hence, an aspect of the present invention is a phase based noise reduction algorithm utilizing a novel process for providing improved speech quality and higher levels of noise attenuation than known algorithms. This technique added a benefit of low mathematical computation requirements as compared with processes used in the prior art. The algorithm as developed by Ingo Schwetz et al. is discussed in the publication "A Cross-Spectrum Weighting Algorithm for Speech Enhancement and Array Processing: Combining Phase-shift Information and Stationary Signal Properties"; Journal of the Acoustical Society of America; 119(2); February 2006, pp 952-964 is also incorporated by reference herein in its entirety.

The process for microphone noise reduction using angular processing begins by supplying an output from two or more microphones to a microprocessor that works to determine the Schwetz angle of the cross product. This provides a group of audio frequencies or bins on a "per band" basis that can be independently processed. A "target" beam angle is then subtracted from an observed beam angle to create a "window" upon which audio signals are to be received. This difference is then multiplied by a speech gating angle function. This gated angle is then compared to a predetermined beamwidth where it is then determined if the received signal value is inside or outside of the predetermined beamwidth or window.

A determination is made if an acoustic signal value falls either inside or outside the window by averaging the acoustic signal in time to create an angular error signal value. The angular error signal value is then mathematically adjusted by a compression ratio (CR). The result of the compression ratio calculation is attack/release filtered to determine the gain for that particular frequency group using a gain value. Thus, a gain floor can then be applied for preventing distortion caused by signals having too much attenuation applied. The final calculated gain is then multiplied by the output of the signal microphone, a delay and sum beamformer microphone array, super-directive array, adaptive linear combiner or space-time beamformer. The resulting signal may be further enhanced by stationary noise reduction or through the use of an expansion algorithm where the completed process ends.

Figure 4:
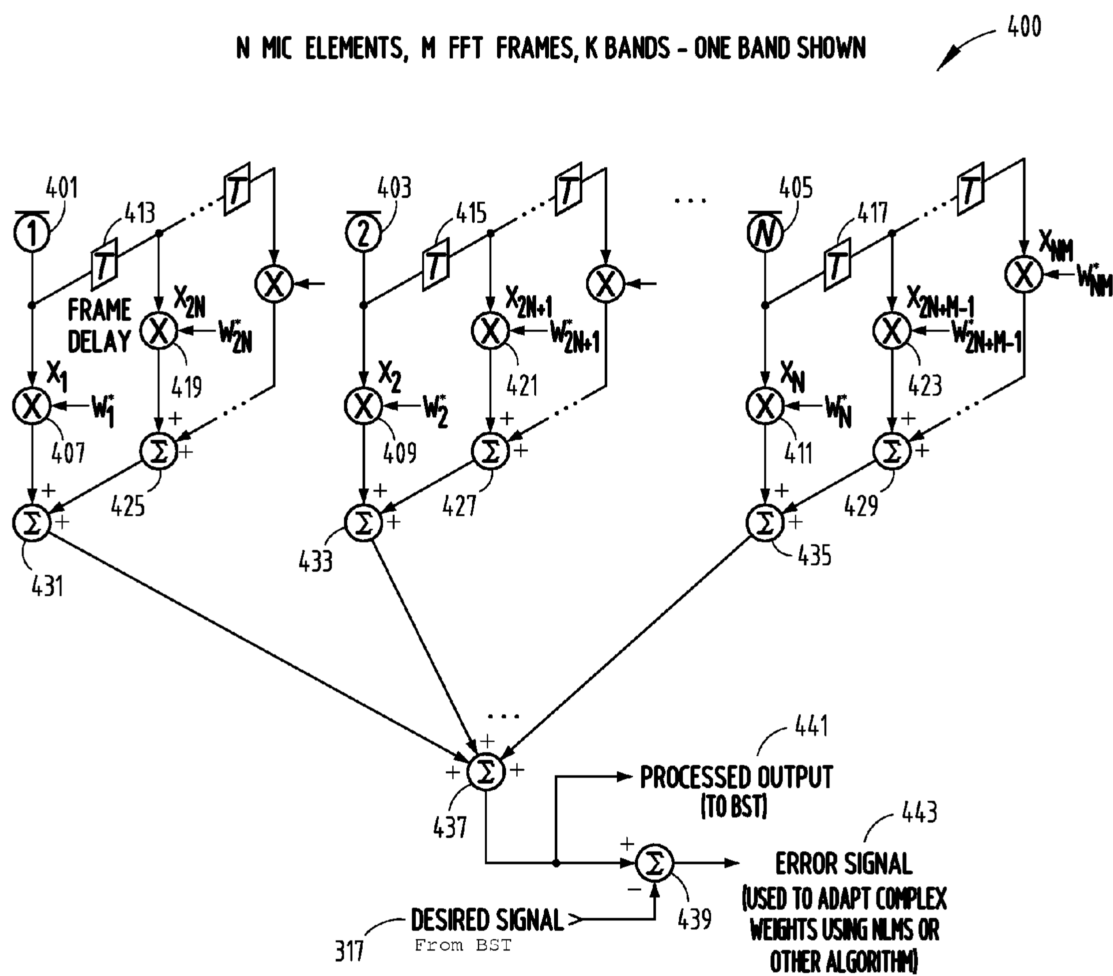
FIG. 4 is a block diagram illustrating a space-time adaptive beamformer in accordance with an embodiment of the present invention.

FIG. 4 is a block diagram illustrating a space-time adaptive beamformer in accordance with an embodiment of the present invention. It should be evident to those skilled in the art that a separate space-time beamformer would be supplied for each desired frequency band e.g. 32 beamformers for 32 bands. The space-time adaptive beamformer 400 includes a plurality of transducers such as microphones 401, 403, 405 that are each separated by some predetermined distance. Longer distances are preferred since this works to improve phase resolution at low frequencies; however the spacing cannot exceed half the wavelength of the highest frequency of interest otherwise the measured phase differences will become ambiguous. Also, larger microphone spacing can increase the sensitivity to airflow induced noise. One solution for dealing with these limitations includes weighting one of more microphones by adjusting its output magnitude in one or more predetermined frequency bands for optimizing performance.

For example, some low frequency bands severely affected by airflow may substantially reduce (by at least 3 dB or more) the magnitude of the weighting of some of the microphones in the array. The same strategy may be applied at high frequencies where the microphone spacing approaches or exceeds one half of the wavelength for a given frequency bin. Further, the adaptive beamformer 400 is referred to as a space-time beamformer since it incorporates a plurality of delays with each of the microphones 401, 403 and 405. It should be understood that although three microphones are shown for purposes of illustration, the method described herein is applicable to two or more microphones. If the delayed signals are for some reason not used, the adaptive space-time structure operates as an adaptive linear combiner. The outputs of microphones 401, 403, 405 are initially supplied to weighting network 407, 409, 411 where they are adjusted in both amplitude and phase. The microphones 401, 403, 405 are also supplied to a plurality of respective time delay elements (e.g. 1 to 100) 413, 415, 417 where the signal is delayed by some predetermined time period which is typically a single FFT frame delay, but more generally some multiple of the FFT frame delay.

As seen in FIG. 4, the outputs of each of the respective delay elements 413, 415, 417 are further supplied to a respective complex weighting network 419, 421, 423 while the output of each of the weighting network 419, 421, 423 is supplied to a sum adder 425, 427, 429. The output of each of the weighting network 407, 409, 411 and the output of sum adder 425, 427, 429 is supplied to sum adder 431, 433, 435 respectively. The outputs of each of these sum adders 431, 433, 435 are then supplied to sum adder 437. The output of summer adder 437 will then be supplied to another sum adder 439 as well as the reference or desired signal input from the BST algorithm as seen in FIG. 2. The noise reduced signal is output at 441. Finally, the error signal 443 from the sum adder 439 is used to adapt the complex weight networks as described herein using a NLMS or other adaptive algorithm. As used herein the terms “supplied to” means but is not limited to directing signals that are directly or indirectly connected and/or communicatively connected in order facilitate use by various components in the space-time adaptive beamformer 400.

Figure 5:
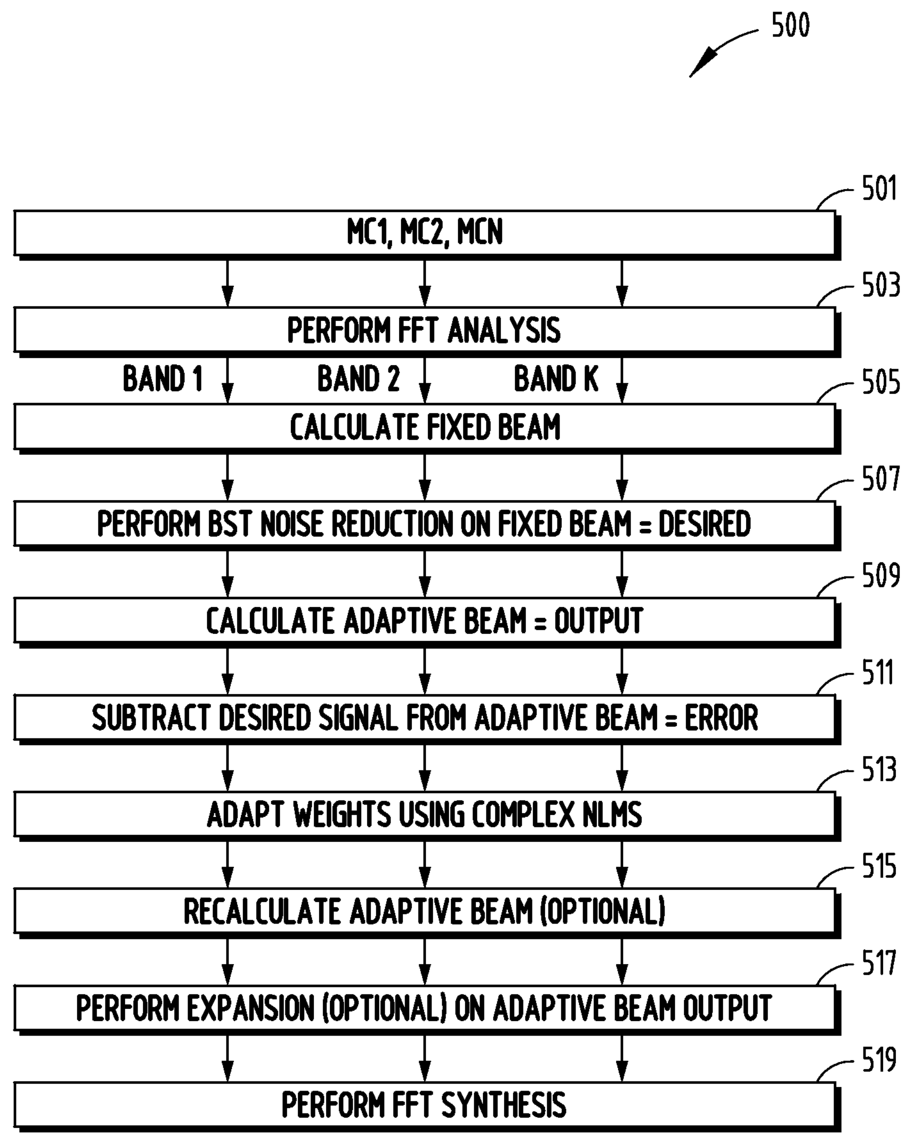
FIG. 5 is a block diagram illustrating the steps used in the space-time adaptive beamformer as shown in FIG. 4 according to an embodiment of the present invention.

FIG. 5 is a block diagram illustrating the steps used by space-time adaptive beamformer as shown in FIG. 4 to provide enhanced audio from a plurality of microphones in a substantially noisy vehicular environment. The audio enhancement process 500 begins where audio is supplied from a plurality of transducers such as two or more microphones separated by some predetermined distance 501. A weighted overlap-add FFT analysis is performed on the sampled input where the sample is divided into a plurality of frequency bands e.g. 32 frequency bands 503. A fixed polar pattern pilot-beam signal is then calculated for each of the frequency bands 505 for allowing noise and other undesirable signal characteristics to be attenuated and/or eliminated in the specific band for that microphone. This fixed pilot beam signal is then supplied to a noise reducing algorithm such as BST or similar for noise reduction processing to produce the reference or “desired” signal 507. An adaptive beam signal is then calculated for each of the frequency bands 509 where the desired signal 507 is subtracted from the adaptive bean signal using a sum adder for providing an error signal 511. The complex weights i.e. amplitude and phase adjustments are then adapted using a complex NLMS algorithm 513 in order to provide a noise reduced signal for use by electronic equipment and/or vehicle telematics. Thereafter, the adaptive beam can be subsequently recalculated on a periodic basis 515 and an additional amplitude expansion can be performed on the adaptive beam output 517. Finally, a separate FFT synthesis is performed to reconstruct the time domain audio signal 519.

Thus, the present invention is directed to a space-time adaptive beamformer where the output of the fixed beamformer is calculated as a pilot beam. The BST or other noise reduction algorithm can be used to compute gain which is multiplied by the pilot beamformer output to obtain a noise reduced reference signal used to adapt a space-time beamformer or adaptive linear combiner to produce an output for a mobile telephone and/or vehicle telematics. The space-time beamformer coefficients may be initialized with the pilot beamformer coefficients for faster convergence. In order to reduce computational requirements, the adaptive beamformer may be used on a subset of the available frequency bands. By generating a desired signal that acts as an artificial noise free signal reference, NLMS or other adaptive algorithms can be used to calculate the best linear approximation based upon BST or other non-linear algorithm processing. This allows approximately the same amount of noise reduction to be obtained without the distortion created due to processing non-linearity.

The process of noise and echo cancellation involves first recognizing noise and the delayed voice signals such as echoes, in the acoustic signals arriving at the microphones. Once the noise and echo are recognized, they can be removed by an adaptive filter from the received signal as long as an adequate reference signal is available. The difficulty is in deriving the reference signal. If a clean reference signal is available there is typically no need for noise reduction processing. In addition to improving subjective quality, DSP processing techniques can help to increase system capacity by preventing the noise and echo from traveling across a mobile telephone networks or the like while allowing the listener to better interpret the spoken word. In this case we are mostly concerned with cancelling echoes that are located close in time to the direct path speech (0 to 100 ms). While these echoes are close enough in time to not be classified as reverberation, they alter the character of the speech so that it sounds “distant”. Thus, an advantage of embodiments of the present invention is to restore the “close mic” character of the speech signal as much as possible. This improves the quality of mobile phone calls and also results in better voice recognition performance as the speech recognition system reference database is typically constructed from close mic recordings.

This is an important advantage as the linear low distortion characteristics of the adaptive filter allow it to be used as an additional noise reduction stage ahead of an echo cancellation stage or other adaptive filter. If nonlinear noise reduction precedes an echo cancellation stage, it can prevent the echo canceller from converging. Similarly, an adaptive filter could be used to cancel output from an entertainment system, anti-noise system or prompts from the telematics system. Again, nonlinear processing preceding this adaptive filter could inhibit its convergence. Also, the adaption rate of the adaptive filter should be slower than the adaption rate of the echo canceller to allow the echo canceller to converge. This can be accomplished by adjusting the relative adaption rates of adaptive filter to the echo canceller or by using a faster algorithm in the echo canceller and a slower algorithm in the adaptive filter. This system also has benefits in reducing vehicle wiring as the microphone can perform direction based noise reduction while needing only a single pair of analog interface wires to a vehicle telematics system. Otherwise the microphone needs to be sent a far end reference signal from the telematics unit so that echo cancellation can be performed ahead of the noise reduction step. Alternatively, multiple microphone signals need to be sent to the telematics system for directional processing. Both cases require extra wiring.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A space-time adaptive beamformer for reducing noise in a vehicle comprising:

a plurality of microphones, at least one microphone of the plurality of microphones configured to communicate a microphone output;

a first weighting network communicatively connected to the microphone output, the first weighting network configured for adjusting a plurality of signal characteristics of the microphone output;

at least one delay network communicatively connected to the microphone output, the at least one delay network configured for delaying the microphone output to generate a time delay output;

a second weighting network communicatively connected to the time delay output, the second weighting network configured for adjusting the signal characteristics of the time delay output of the at least one delay network;

at least one sum adder communicatively connected to the first weighting network and the second weighting network, the at least one sum adder configured for adding a first weighted output of the first weighting network and a second weighted output of the second weighting network; and wherein an output of the at least one sum adder is combined with an artificial noise free reference signal to provide an error signal used to generate a low distortion noise reduced output.

2. A space-time adaptive beamformer as in claim 1, wherein the plurality of signal characteristics include both amplitude and phase.

3. A space-time adaptive beamformer as in claim 1, wherein the artificial noise free reference signal is produced with a normalized least mean squares (NLMS) algorithm.

4. A space-time adaptive beamformer as in claim 1, wherein the beamformer is used for providing enhanced audio to a mobile telephone.

5. A space-time adaptive beamformer as in claim 1, wherein the beamformer is used with vehicle telematics.

6. A space-time adaptive beamformer as in claim 1, wherein a weighting of at least one output of a microphone of the plurality of microphones is adjusted in at least one predetermined frequency band for optimizing performance.

7. A space-time adaptive beamformer as in claim 1, wherein the beamformer is located in a vehicle rearview mirror.

8. A space-time adaptive beamformer as in claim 1, wherein the beamformer is located in a vehicle rearview display system.

9. A method for reducing acoustical noise in a vehicle using an adaptive beamformer comprising the steps of:

providing a plurality of microphones with each one of the plurality of microphones having an output;

performing a fast Fourier transform analysis on the output of each of the plurality of microphones for dividing the microphone output in to a plurality of frequency bands;

adjusting a complex weight of at least one microphone output for each frequency band for determining a fixed beam signal;

utilizing a normalized least mean squares (NLMS) algorithm for each of the plurality of frequency bands for providing a reference signal;

providing an adaptive beam signal from the fixed beam signal;

subtracting the reference signal from the adaptive beam signal for providing an error signal;

utilizing the error signal for further adapting the complex weight of the at least one microphone output for providing a noise corrected signal; and supplying the noise corrected signal to an electrical device used in the vehicle.

10. A method for reducing acoustical noise as in claim 9, further comprising the steps of:

adjusting the complex weight in both amplitude and phase of the at least one microphone;

generating the reference signal so that environmental noise is removed; and locating the adaptive beamformer in a vehicle rearview system.

11. A method for reducing acoustical noise as in claim 9, further comprising the step of:

adjusting the complex weight of the at least one microphone output of the plurality of microphones in at least one predetermined frequency band for reducing low frequency noise created by airflow.

* * * * *